Jan. 25, 1966   R. L. OLSON   3,231,256
SPRINGS EMBODYING CLOSED CELL ELASTOMERIC MATERIAL
Original Filed May 26, 1961   3 Sheets-Sheet 1

INVENTOR
RICHARD L. OLSON
BY
ATTORNEYS

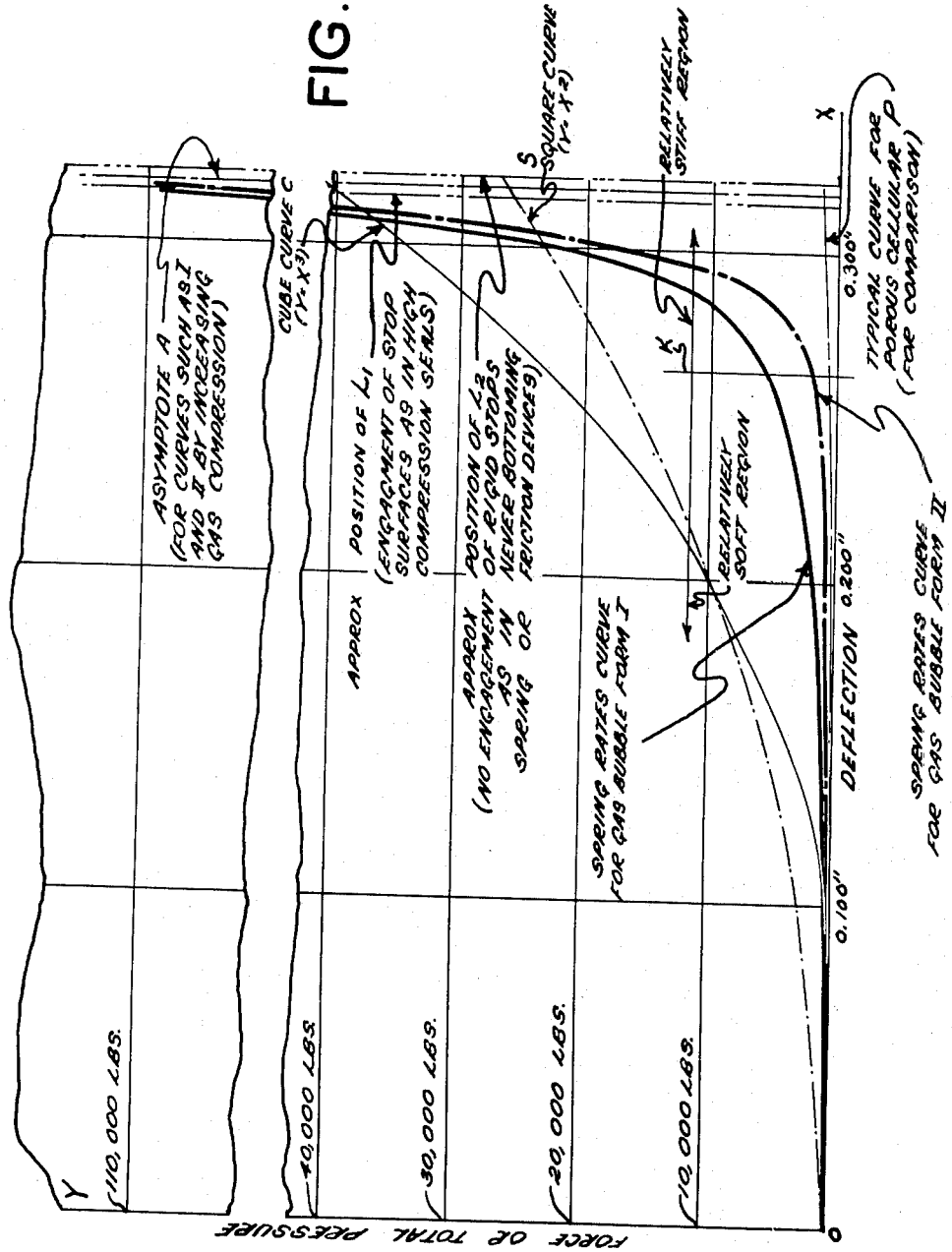

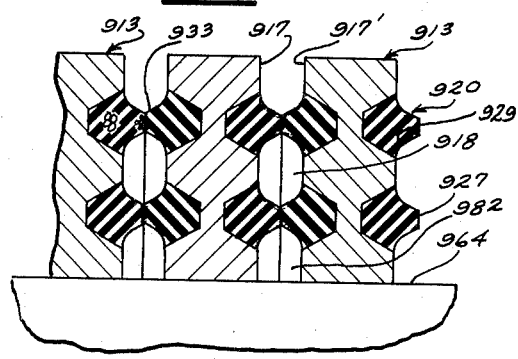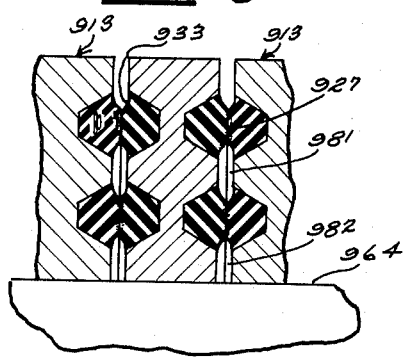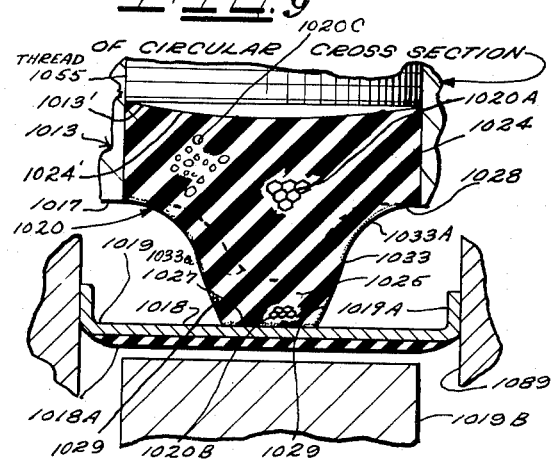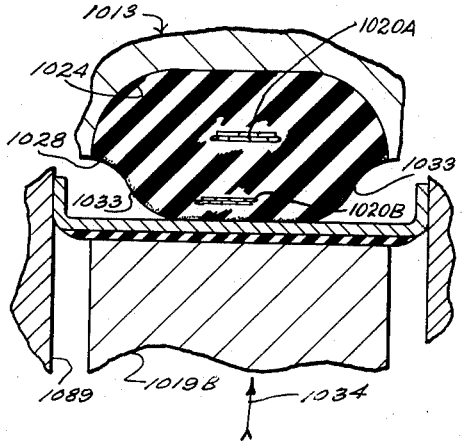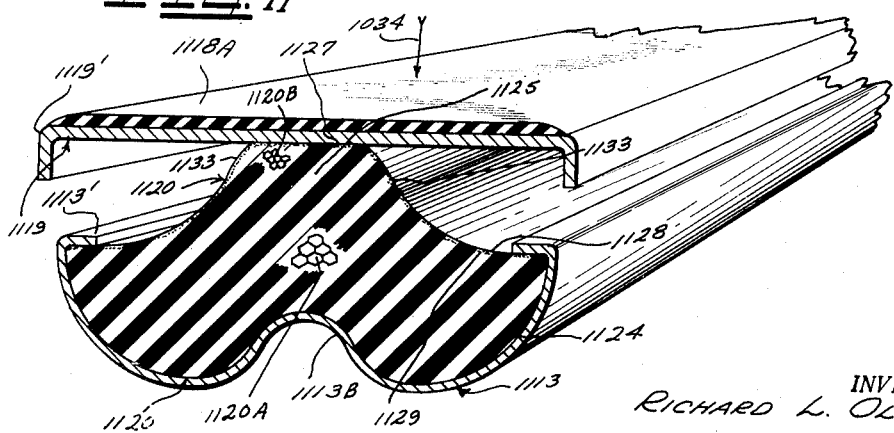

United States Patent Office 3,231,256
Patented Jan. 25, 1966

3,231,256
SPRINGS EMBODYING CLOSED CELL
ELASTOMERIC MATERIAL
Richard L. Olson, Hickory Hills, Ill., assignor to Dike-O-Seal, Incorporated, Chicago, Ill., a corporation of Illinois
Original application May 26, 1961, Ser. No. 123,917, now Patent No. 3,166,332, dated Jan. 19, 1965. Divided and this application Dec. 4, 1964, Ser. No. 420,481
15 Claims. (Cl. 267—1)

The present application is a division of my application Serial No. 123,917, filed May 26, 1961, now Patent 3,166,332 dated January 19, 1965, and through that application is a continuation-in-part of my application Serial No. 696,271 filed November 13, 1957, now abandoned.

This invention relates to improvements in multi-cell elastomer springs, and more particularly such springs in which the reaction means comprise molded multi-closed cell elastomer mass or masses.

There have been previously unappreciated as well as unresolved problems, difficulties and limitations relating to various types of resiliently deformable or flexible members of elastomeric grossly deformable (as distinguished from bulk deformable) materials for use between relatively movable and relatively rigid members as spring devices. As examples only and in general, it may be noted that prior art or previously known members of flexible or elastomeric materials intended to be highly flexibly deformable (as for a large amount of travel by deformation or to give a close or complete conformation to an engaged surface) have been quite limited or deficient since such solid material members had to deform or flex as wholes and their softness or flexible conformability was limited or determined by the flexibility and softness of the material itself, which had to be relatively and undesirably stiff to provide adequate strength, wear resistance, and other such properties. As another and more specific such example, it is noted that previous spring devices or the like of rubber or suitable elastomeric materials were often desired to have very rapidly increasing spring rates (i.e., to be initially very soft or of a low spring rate and progressively and to rapidly become stiffer or of high spring rates upon increasing loads or deflections). However, simple or economic prior art forms of such devices have had relatively linear spring rates so that various complex and costly multi-step configurations and other expedients have been employed to achieve such rapidly increasing spring rates.

As another such example, it is noted that where it has been desired to use confinement in a rigid body and also to use a resilient compression of gas or air to achieve rapidly increasing spring rates and for related such purposes that such devices have suffered from short life, sealing difficulties, high cost and difficulties in holding high gas pressures under high loads or for long travels and, in general, from complexity.

A general object of this invention is the provision of members, preferably molded, having progressively and rapidly increasing stiffnesses or spring rates and, more particularly, according to an exponential curve which is preferably of a cube power or higher without complexity of form or parts.

A further object of this invention is to be found in the provision of resiliently compressible members having an initial confinement (in a relatively rigid member) which compressibly increases to substantially match the applied compressing forces and deflections, and more particularly to provide such increasing confinement in combination with rapidly, or with similarly, increasing spring rates.

Still another general object of this invention is to provide resiliently compressible members or devices wherein their local volume reduction or soft resilient compressibility permits an essentially local deformation or bending of a surface without requiring deformation or bending of the whole of a part of such a member.

An additional general object to this invention is to be found in the provision of a molded or similarly formed member which is initially and increasingly confined and is readily deformable or may have greater travel or motion by reason of a greater softness or lower spring rate together with high strength, long life and low cost.

Another additional general object hereof is to provide such a member which is resiliently compressible and has air spring-like characteristics without the previously inherent disadvantages of previously known types of air springs or the like.

A further and more specific general object hereof is the provision of a device including a member which is flexibly deformable and resiliently compressible by comprising, at least in material part, unconnected, gas filled bubbles or closed cells of flexible material whose main portion is relatively rigidly confined and with a projecting portion to give a progressively increasing confinement with, and to match, displacements or applied pressures and more particularly to also give progressively and rapidly increasing spring rates.

Objects of the spring aspects of this invention relate to the provision of a spring device including a member which comprises at least in material part of gas filled sealed cells or bubbles of interconnected flexible (and preferably elastomeric) walls and which has a relatively rigidly confined portion and an integral projecting portion to be compressed into said confined portion by an always engaged compressing surface member or always by the simultaneous engaging of all of the outer end of this projecting portion by a compressing surface, and, more particularly, where such a projecting portion is curved and shaped to prevent the formation of any sharp bends, corners or pockets as it is progressively compressed and confined, preferably, with a rapidly increasing spring rate, from the compression of its all confined gas volumes.

A yet further object of the invention is to provide new and improved multi-closed cell elastomeric spring devices having utility as return springs, bumpers or buffers, machinery mounts and other types of supporting springs, and the like.

Other objects, features and advantages of the present invention will be readily apparent from the following detailed description of certain preferred embodiments thereof taken in conjunction with the accompanying drawings, in which.

Figure 5:
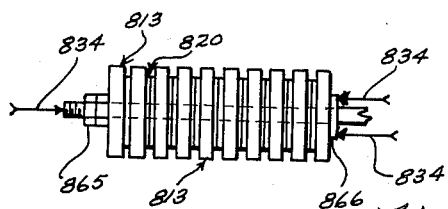

FIGURE 5 discloses a stacked arrangement of disk type spring units;

FIGURE 6 is a graphical illustration of certain typical displacement versus load curves or the progressively increasing or exponentially increasing spring rate curves typical of spring devices according to this invention;

FIGURE 7 is a fragmentary sectional elevational view of a stack of guided spring disks or plates;

FIGURE 8 shows the assembly of FIGURE 7 as compressed in service;

FIGURE 9 is an axial sectional elevational detail view through a circular or button type spring and assembly;

FIGURE 10 shows a spring assembly similar to FIGURE 9 but with the spring substantially compressed; and FIGURE 11 is a sectional perspective view of an elongated spring or buffer device comprising an embodiment of the present invention.

Figure 1:
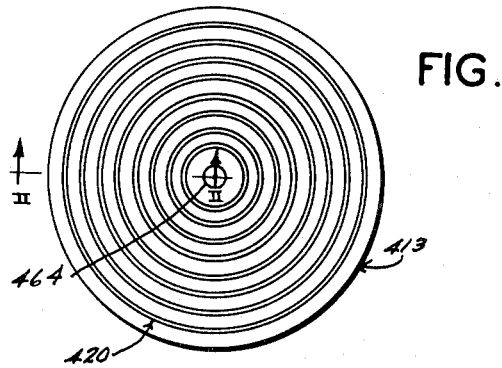
FIGURE 1 is an axial or end plan view of a spring unit including elongated or circular, concentric, molded spring members.
Figure 2:
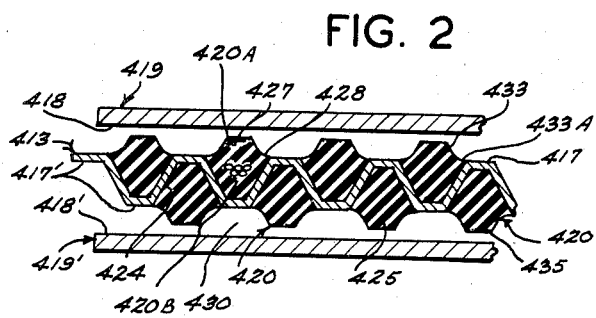
FIGURE 2 is a transverse enlarged fragmentary sectional detail view taken substantially on the line II—II of FIGURE 1.

In FIGURES 1 and 2 is disclosed a spring device wherein a plate or disk 413 may comprise a relatively thin sheet metal stamping or the like whose thickness is proportioned to the symmetry of the loads to be encountered. This stamping has opposite faces 417 and 417′ carrying multi-closed cell elastomer compressible spring members 420 of elongated, concentric circular ring form mounted in respective oppositely opening alternating grooves or trenches 424 in the faces of the plate.

Each of the compressible spring members 420 is of a compressible, cellular construction and preferably comprises an elastomer possessing a high degree of resiliency. While cellular rubber as such may be used, different types of synthetic resinous materials that are capable of being molded and set to a compressible, cellular elastomer may be used. In a desirable construction, the spring material is conformed to the contour of the grooves or trenches 424 and bonded thereto with such thorough adherence that during compression the spring will not separate from the surfaces defining the groove.

In a preferred method the material used for the springs 420 is such as may be cured or set in situ by vulcanization or baking, catalytic curing, and the like. For example, where a synthetic plastic material such as polyurethane, and the like, is used, it may be molded in a suitable fluent state and cured cold. Where the composition is a vulcanizable type it may include a suitable natural or synthetic rubber, a plasticizer, a vulcanizing agent, and a gas liberating agent capable upon the application of heat of liberating substantial quantities of gas and thereby swelling or expanding the elastomeric composition and producing a self-sustaining, resilient, elastic multi-cellular sponge rubber-like body of any preferred resistance to compression, that is spring rate.

In effecting the curing, by whatever method suitable or preferred, a master plate is provided with grooves matching the grooves 424 and having the preferred width and depth and shape to provide a ridge rib portion 425 on each of the spring members. A suitable quantity of the raw materials for the spring members 420 is placed into the respective grooves of the plate 413 and the master plate or plates assembled therewith to complete chambers with the confronting grooves. The assembly is then held together while exothermic or catalytic curing and expansion to provide the cellular structure proceeds, or is placed in a suitable curing oven and subjected to proper temperature or temperatures for the proper length of time to effect expansion and curing of the spring members into a homogeneous cellular, sponge body uniformly throughout the length and width of the spring members. By having the surfaces within the grooves 424 treated to assure active bonding of the material of the spring members 420 thereto as an incident to the curing process, and by having the surfaces of the master plate opposing the plate 413 in each instance treated to assure non-adherence thereto of the material of the spring members 420, upon separation of the master plate or plates from the member 413 after curing, the spring members 420 separate from the master plate but are carried bonded to the member 413 within the grooves 424.

Various pressure responsiveness and spring resistance and return characteristics can be attained by suitable variations in cross-sectional size and shape and density, as well as composition of the spring members 420, location and number of the spring bodies 420, the proportion of confinement of the spring body, and so forth.

The compressible spring members 420 are comprised either substantially entirely, or at least in material part, of fluid or gas-filled closed or sealed, discrete, small, unconnected, independently acting, generally bubble-like cells with common walls of flexible elastomeric material, with at least part of the bubble-like cells being gas-filled, whereby the spring members are resiliently deformable and bulk compressible at least partly into the confined part or portion thereof by resilient compression of the gas in the gas-filled bubble-like cells and more particularly in the confined part of the compressible member for thereby resisting movement of the relatively movable part of the spring member toward the confined part with rapidly increasing spring rate. Although it is preferable to have the bubble walls of material which is inherently and materially elastomeric, in view of the presence of the numerous gas-filled bubbles, it will be seen that the flexible cell wall material need have little or no rubber-like or elastomeric properties, if it is desired to use such a material, since compressibility of the numerous small volumes of confined gas gives the resilient bulk compressibility and returnability characteristics useful for the advantageous spring action.

The cells or bubbles need not all be of the same sizes, materials or other properties, since advantages of this invention may be realized by the use of various mixtures or blends of different types of materials for the same or different cells or bubbles. As an example, smaller and inherently stronger bubbles 420A may be disposed in regions where greater strength is required, such as adjacent to or in the unconfined portions or areas of the spring members such as in the ridge portions 425, with larger bubbles 420B, which have lower inherent spring rates and initial stiffnesses, that is are more readily compressed, in the well-protected interior or confined portions of the spring member.

Not all of the fluid or deformable material filling the bubbles or cells need be a gas which is elastically compressible, since a suitable percentage or part of the bubbles in a given deformable spring member, or even in all of them, may be filled with some other material such as a liquid to provide different properties by its substantial incompressibility, or particularly, to give a high degree of friction or energy absorption where a highly viscous material or liquid is so employed. This permits the introduction of any reasonably desired amount or percentage of frictional action into a deformable member according to this invention and provides for a number of very simple and desirable forms of resiliently returnable, frictional spring devices with combined or built-in shock absorbing characteristics by reason of such viscous liquid filled cells, which are deformed during the preferably long travel or relatively flexible deformation of such a unitary member. Where a substantial percentage of the bubbles are filled with a readily deformable and friction producing and highly viscous liquid, their friction producing action will be very much greater than that given by the relatively much smaller amount of cell wall material, particularly since it is usually not feasible or practical to provide adequately strong cell walls from very soft elastomeric materials or from low durometer rubber-like materials having high degree of internal friction and a high deformability or softness.

The spring stiffness or softness and the shape of the spring rate curve of any of the various forms of spring members according to this invention will also be modified by the cell wall thickness and by the elasticity of the elastomeric material. The percentage or part of the total volume of such a deformable member which is occupied by the flexible or elastomeric wall material in relation to the remaining part of the volume occupied by gas will determine how much such a spring can be bulk compressed, neglecting the very small compressibility of the elastomer itself.

Depending on the desired properties and results and for different types of materials and applications as disclosed herein, the flexible or elastomeric, cell wall material should form from a maximum of about 85% to 90% of the total volume of such deformable spring member where high compression engaging pressures must be resisted, down to percentages as low as about 10% to 4% of the total volume for the cell wall material where light unit loads or low pressure applications are to be met and/or where high strength materials such, for example, as urethane sealed cell or bubble sponges are employed.

Another important aspect of this invention resides in selection of the preferred range of absolute sizes (or corresponding volumes) of at least the effective preponderance of the fluid filled bubbles, taken in connection with, or for, a preferred bubble wall or separation thickness (determining the initial percentage of confined gas) and the stiffness or springiness as well as the strengths of the particular material used for such walls in any case. There are a number of different factors affecting the relationships for the preferred upper and lower size limits for the bubbles. For high strength materials and for high percentages of confined fluid or gas, the upper limit for the diameters of the effective preponderances of the bubbles or closed cells may be on the order of about 0.02 to 0.03 inch to thereby benefit by the rapidly increasing resistance against bursting and flextural strength as afforded by the at least partial confinement of the spring masses. The lower such limit, particularly for low percentages of confined gas is a practical one, depending on the ability to form interbubble walls of a correspondingly reduced thickness with particular materials and by particular expanding, blowing, or bubble-forming techniques, and is about 0.001 inch diameter or somewhat less for strong material and relatively thick walls. The smaller the bubbles are (for a given percentage of confined gas down to practical limits) the more effective or stronger they become in providing a soft deformable outer layer, particularly, and in resisting bursting out of relatively high pressures at unconfined areas. The larger bubbles may be used, if desired, in the less critical regions or deep in the initially confined part of the body or even in the inner portion of the projections 425. In such regions there may also be a higher percentage of confined gas or relatively thinner walls.

Of course, for ease of forming or molding the bulk compressible spring bodies, particularly where they are of small cross-section, it will no doubt be found simpler to make them generally the same throughout except at the progressive transition or boundary region, as it merges into a skin which may, if preferred, be provided at the unconfined surfaces of the spring members. Thicker and tougher or more wear resistant, but of course less flexible, skins may be used where needed for rough use and the like, but where preferred no appreciable skin need be used because the bubble walls at the boundary layers will confine the fluid within the bubbles.

It is also contemplated under the scope of this invention that the fluid or gas in the bubble-like cells may be under a relatively high initial pressure (up to the strength limits of the cell wall material) in any form of the invention.

An important feature resides in that the partial confinement of the spring members increases progressively and in a related or matched fashion to the compressing or engaging loads as the projecting portion is compressed or displaced down into the initially confined portion. This has a number of advantages including the resulting ability of the spring members of gas-filled cells to withstand very high pressures without bursting of the cells or outer skin since the bubbles are increasingly confined and restrained against bursting as the pressures increase.

It is also highly desirable (particularly for elongated members under any of the forms hereof), that the entire extent or length of the outer surface or top of the crown or ridge rib should always be substantially engaged to thus always apply a matched and increasing confinement to the entire extents or lengths of such outer surfaces as they are compressed according to progressively increasing spring rates. The avoidance of abrupt changes in compression and confinement of such spring members along their extents or lengths is particularly important for high maximum pressure applications in high load springs. This prevents bursting at any one less restrained portion. Further, in more lightly loaded spring members it prevents fatigue, undue flexure or bends at points where the compression (and the resultant increased confinements) differ.

Referring now to FIGURE 2, in one possible use of the spring member 413, it may be interposed between opposing respective compressing members such as flat metal plates 419 and 419' having, respectively, a surface 418 opposing the spring member surface 417, and a surface 418' opposing the spring member surface 417'. These substantially rigid plates 419 and 419' will make full engagement with all of the crown surfaces 427 of the respective opposing spring members 420. Further, and if preferred, the plates and spring member, or any preferred series or stack of the spring members or spring members and plates may be suitably guided as by a center pin or guide rod 464 (FIG. 12).

In applications of units such as 413 in spring devices or in resiliently returned or other types of friction or energy absorbing devices, it will be noted that the spring members 420 may also usefully serve as seals since they may trap a fluid, and particularly, a compressible gas in the annular spaces 430 between them to thereby increase their spring or return action. It is also to be understood that the elongated members 420 may be arranged in other patterns than circular since the closed loops may be of any suitable shapes and, in fact, need not necessarily form completely closed loops.

Figure 3:
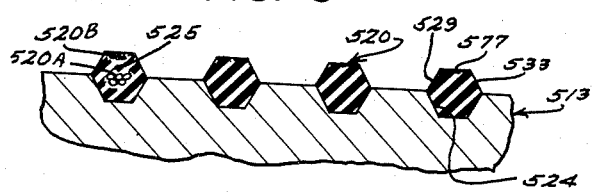
FIGURE 3 is a sectional view similar to FIGURE 2 but showing a modified form of the invention.

In FIGURE 3 is shown a spring unit 513 which may comprise a plate or member of substantial thickness having multi-closed cell elastomer spring members 520 provided with bubble masses 520a and 520b and partially confined within grooves or trenches or recesses 524, with the projecting portions 525 adapted to be bulk compressed into the body of the respective spring member substantially as described for the spring members 420. However, instead of the generally concave shape of the side walls as in FIGURE 2 comprising smaller volume or depth side wall pockets 433 formed with rounded bottom due to curve 433a, the spring units 520 are provided with sloping walls 533 from crowns 577. The particular generally hexagonal cross-section and shape of the spring members 520 makes them especially suitable for lower compression springs intended for light duty or for light loads and a relatively small amount of compression of the projecting portion into the cavity.

Figure 4:
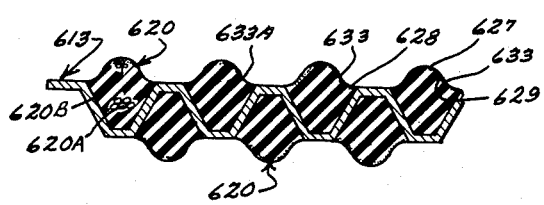
FIGURE 4 is a similar sectional view of a further modification.

In FIGURE 4 is disclosed a plate-like unit 613 which is similar to the unit 413. However, the unit 613 has bulk compressible seal members 620 which have very importantly different profile or cross-sectional shape for their projecting portion 625. The spring members 620 in each instance has discrete, small closed bubble-like cells 620A and 620B. The life or durability of the projecting portions 625 and the skin 629 thereon (if present) where the projecting portion has a cross-section or profile so that it has a smoothly progressive changing and reversing curvature from one side to the other. As shown, such curvature is of the ogee type without any abrupt changes or sharp bends or high stress points either initially or at any time during its deflection and deformation to a narrower width as it is pressed down into the cavity or trench by a progressively widening engagement either with a rigid surface or with another such deformable member. This ogee curve may thus smoothly and progressively flatten into a straight line. From the curved crown 627 there is a smoothly curved transition to the sides 633 and then to the lateral base surfaces 628 which may merge with the contiguous surface of the plate 613. A distinct advantage of this ogee curvature shape of the spring member projection resides in that as the projection flattens out under compression there is no tendency to draw in at the outer edges of the outer extremity surface areas 628. Various modifications of the ogee curvature may be afforded for different conditions, such as different rib heights, bubble spring rates, bubble wall strengths and stiffnesses, and other properties of the gas-filled bubble members and their confinement as has been disclosed.

FIGURE 5 may be considered as of a more or less schematic nature and discloses how a stack of suitable length of spring plate units 813 having bulk compressible multi-cellular elastomeric springs 820 may be provided on a rod or mandrel between abutments 865 and 866 and whereby compression forces 834 are adapted to be applied. Such stacks of suitable length are useful to achieve a desired amount of total travel or deflection and also to permit by their metal plates with their heat conduction, a much higher degree of heat dissipation, which is quite useful in cases of shock or energy absorption where the devices are subjected to rapidly repeated or cyclic vibrations or deflections tending to build up heat in the spring members 820.

In FIGURES 7 and 8 a stack of disk-like plate units 913 mounted on a rod or mandrel 964 is shown in which the circular grooves or trenches in which the multi-closed cell bulk compressible elastomeric spring members 920 are confined are machined or cast. Such heavier and stronger plate units are useful for very high pressures and loads. It will be understood that the spring members 920 may have any preferred cross-sectional profile such as that shown in FIGURES 2 and 3 and provided with crowns 927, skins 929, if preferred, and side surfaces 933. As shown at 918 and at 982 in FIGURE 7, spaces are closed between respectively adjacent rings of the crown-to-crown spring members and between the innermost ring of spring members and the mandrel 964. As shown in FIGURE 8, the projecting portions of the spring members have been flattened into nearly straight lines as the surfaces 917 and 917' of opposing members 913 are nearly at their end stop or engaging positions wherein the bulk compressibility of the gas-filled bubbles in the spring members 920 will give a very high resisting pressure and the air trapped in the spaces 981 and 982 will afford additional resistance to complete contacting of the spring carrying disks. Protection against overcompression of the spring members is had when the opposing surfaces of the metallic disks bottom against each other.

Reference will now be had to certain devices as represented in FIGURES 9, 10 and 11 which are especially suitable to be used as spring or resilient return devices such as end bumper springs, friction devices such as shock absorbers or vibration isolating mountings or supports for vibrating equipment or machinery or as combined spring and frictional devices.

In FIGURES 9 and 10 the suitable strength casing or recess forming member 1013 has a suitably shaped and suitable depth, circular cross-section cavity 1024 which is here illustrated as initially confining the major portion of the volume of a round or button-like compressible member which is designated as a whole by 1020 and has the exposed side edges 1028 which are here horizontal and substantially coplanar with, or coextensive with, surface 1017. The projection portion or crown 1025 has still another form of ogee curve profile or cross-section as shown at 1028, 1033A, 1033 and 1027 and is here a surface of revolution. The outer surface 1027 is here shown as flattened. This flattening may be done in various ways either initially or subsequently but is here compressibly flattened after member 1020 has been suitably molded so that surface 1027 is suitably secured as by adhesive cement or bonding to the upper, and here flat, surface 1018 of the engaging plate-like member 1019, which is large enough in extent to extend out beyond the sides 1028 so that it may, if necessary, engage surface 1017. It will of course be understood that the diameter of 1019 may be made smaller so that it can never engage surfaces 1017, if desired. As shown, the lower face of 1019 has a suitable protective covering such as the bonded on rubber bumper layer 1018A. The surface of 1018A may be struck or engaged, either continuously or intermittently, by any suitable means such as the plunger 1019B. Member 1019 may be suitably guided as by having its peripheral edges inturned as shown into cylindrical portions 1019A which are guidingly engaged in the correspondingly cylindrically shaped guide surfaces of guide member 1089. Portions 1019A slide around the outside of 1013. It will, of course, be understood that only a simple light plate may be used at 1019. Also such a plate or the like may be omitted, particularly where the lower end of 1025 is to engage a suitable surface or especially where all of such a surface is substantially always springily engaged in normal use.

FIGURE 9 shows another form of means to adjust the initially confined volume or its initial pressure. The axially adjustable screw base 1013' has a curved end 1024' and threads 1055 which are self-locking. Adjustment of the whole end of 1024' will also change the shape of curve 1033.

Another profile shape is shown by the profile curve 1033a shown in dots and dashes. This illustrates that various other heights and ratios of volume of the projecting portion relative to the volume of the confined portion may be employed under this invention and depending, as disclosed above, on the desired spring rate curve and also, of course, upon the relative volume of compressible gas to solid material in the entire member 1020. Such a lower projection 1033a is desirable with the higher density or more gas or wider spaced bubbles 1020c.

As shown in FIGURE 10 the ogee surface curve of the projection portion 1025 has been partially and smoothly compressed into a different but generally similarly ogee curve with the width or diameter of its flattened top 1027 materially increased by its progressively increased engagement area with surface 1018. As also illustrated in this figure, the edges of portions 1028 remain essentially horizontal or coplanar with 1017.

It is to be understood that forms such as FIGURE 9 (like the other forms hereof) may also employ in the matrix or body of elastomer different sizes of bubbles including the larger interior bubbles 1020A and the smaller and stronger bubbles 1020B adjacent the exposed surfaces of the projecting portion and merging progressively into even smaller bubbles to form the strong but highly flexible and deformable skin 1029. The fact that the compressible skin is, in effect, formed by progressively smaller bubbles is important in preventing the outward bulge at the outer edges, as at 1028, under high compression. In this connection it is to be noted that the compressibility or rubber-like properties of the skin itself are particularly important in circular forms or non-elongated forms such as this since the skin surface has to undergo a material transverse compression in two dimensions, or reduction in area as it is progressively engaged as shown. Thus the use of rubber-like or highly elastomeric materials (particularly for the projecting portion and its skin portion), is particularly useful in such forms although it is also desirable in the elongated forms disclosed herein wherein there is bending and only a one dimensional compression or a reduction in transverse width of the engaged surface.

FIGURE 11 shows another elongated or generally strip-like form wherein the member 1120 has its initially confined and much larger volume portion held in relatively rigid means 1113.

FIGURE 11 also shows that the inner confining surface 1124 of the relatively rigid confining or thin metal member 1113 may be extending around over the flat side edge portions 1128 by turned in or bent over portions 1113' (which may be readily formed by extrusion or the like). This member 1113 also includes a bottom and longitudinally extending recess or corrugation 1113B to stiffen it and to reduce the central part of the confined volume. It will be understood that a plurality of such stiffening bends or corrugations may be employed if desired. This figure shows the side edges 1119′ of the long engaging member designated as a whole by 1119 as being curved downwardly to extend around and enclose the corresponding sides of member 1113. It will thus be seen that this formation gives a higher degree of enclosure and may be used for a better appearance. The outer and exposed surface of member 1119 may be suitably finished or may employ the rubber bumper or the rubber layer 1118A suitably bonded or cemented in place.

In this embodiment, similarly as in the embodiment of FIGURE 9, the closed cell elastomeric material body has a projection 1125, herein in the form of a rib, afforded with a top 1127. Within the body mass of the member 1120 are larger interior unconnected cells or bubbles 1120A while the projection 1125 has smaller cells or bubbles 1120B. On its exposed surfaces, the projection 1125 is provided with a curved, in this instance generally ogee, contour 1133 merging with the margins 1128. The exposed surfaces of the projection 1125 and the marginal areas 1128 are desirably provided with a highly flexible and deformable skin 1129.

This member 1119 is particularly useful when such an assembly or device is employed as a bumper, as for automobiles or the like. In such uses, it is important that the entire length or extent of the rib 1125 of member 1120 is always engaged and compressed because of long cover plate 1119. This device of FIGURE 11 is also intended to be used as a length of a vibration isolating or vibration absorbing mount for vibrating equipment or machinery. It is to be understood that suitable lengths or shapes of such devices may carry the weight of vibrating equipment to damp out or convert this vibration into heat. Devices according to this invention are superior for such uses in view of the extreme softness enabled by the high strength, gas-filled cells. This softness and the low spring rates permits the highly desired long travel needed for such devices together with a high degree of strength and the ability to withstand high extreme loads or pressures. Plate 1119 may be omitted if there is a suitable full length engaging surface.

Referring to the curves of FIGURE 6, it is to be noted that curves I and II may be considered as typical or representative curves for highly compressed spring members under this invention, and which consist either entirely or substantially of gas-filled bubbles or sealed cells. These two curves I and II are generally similar except that curve II has a sharper break at its knee portion or between its relatively stiff region and its relatively soft region, which are here somewhat arbitrarily divided by the vertical dividing line K.

For purposes of comparison, and to bring out certain of the attributes of high pressure curves typical of the bubble forms of this invention (as shown in curves I and II, two curves S and C show respectively square and cube form curves or curves which are according to the equations $Y=X^2$ and $Y=X^3$ respectively. It is thus apparent that curves typical of this invention (or such as curves I and II) have the rapidly changing curvature of curves to a high exponent. As illustrated, such exponent may be materially higher than the cube power. They may also be more nearly linear.

It is, of course, to be understood that within the purview of this invention, the relative volume of gas in the bubbles, the relative amount or percentage of confinement and other factors may be changed to change the shapes of such curves or shift them horizontally or vertically. Thus, high pressure curves such as I and II, and which are here considered as typical or illustrative only, may be made to have much more gradually changing slopes so that they become more like square rate curves. In fact, they may have rates of changing curvature of less than square rate if desired.

Considering curves I and II from another aspect, it is to be noted that they are asymptotic not only to the X or deflection axis but to the ordinant asymptote illustrated by A. This illustration brings out graphically that as the very small unit volumes of gas in the bubbles are compressed to a very high degree so that these small volumes of gas come up to a pressure or effective rigidity approaching that of the confining flexible and preferably elastomeric walls, the entire compressible members become very rigid indeed and approach asymptotically the line A. That is, they progressively become infinitely stiff.

It will thus be apparent that resiliently compressible members according to this invention (and devices as employing them) may be arranged to never bottom or so that the travel limiting surface will never bump or engage together with a jerk. This last is particularly useful in spring devices or friction devices where it is desired to prevent such bottoming or bumping. This is illustrated by the vertical line $L_2$ in FIGURE 6 which is beyond line A.

In contrast, however, vertical line $L_1$ illustrates that such stop or rigid surfaces may engage to limit the further compression or further pressures and rupturing forces acting on the resiliently compressible devices.

For such high compression seal purposes and for other applications where very high degrees of compression or high pressures are used, the relatively stiff region to the right of the vertical line K is employed (as well as the relatively soft region). In such case the very rapidly increasing spring rates (from the bubbles) are often particularly important or desirable, particularly for uses such as end bumpers and other cases where it is desired that the spring stiffness increase very rapidly indeed near the end of its travel.

In contrast, however, for other spring, for frictional device applications it is sometimes only desirable or useful to employ essentially the relatively soft region or to the left of vertical line K. In such cases, the combination of extreme softness together with strength, is particularly useful and the rapidly increasing spring rates (to the extent that a certain percentage of the bubbles are filled with a gas) is of value primarily in giving greater strength and in withstanding excess loads or pressures.

Curve P is shown in FIGURE 6 to generally illustrate the nature of an equivalent curve for such compressible members when they are made entirely or predominantly of open cell or porous cellular and elastomeric material. As is shown here (with the vertical ordinants and the increasing spring rates of this curve P somewhat exaggerated for purpose of illustration) the open or porous form has a high degree of softness and an almost linearly increasing spring rate with relatively little rapidly increasing slope or spring rates until the air is substantially all pressed out of the various sizes of interconnected voids (which end point is not illustrated here). As noted above, this open or porous form is less desirable since it does not have the high strength with softness and requires the undesirably thicker outer skin for practical uses.

It is also to be noted that curves I and II of FIGURE 6 also represent values obtained from tests run by an engineering laboratory on double end disk units according to this invention made substantially in accordance with the disclosure of FIGURE 7 with the trench being approximately ½″ wide at its face, ¼″ deep, ¼″ wide at its bottom and the rib being approximately ⁵⁄₃₂″ high, ³⁄₁₆″ wide at its top and ¼″ wide at its base.

For curve I, a single double ended, 6″ O.D. disk was tested. It had on each side, three concentric ring bubble cellular elastomer bodies as noted above and with outer trench face diameters of approximately 5¾₁₆″, 4¹⁄₃₂″, and 2½″. For similar but sharper break curve II, a similar single, double ended 4″ O.D. disk was tested. It had two concentric such rings on each side with trench face outer diameters of approximately 3½" and of 2¼". As measured by liquid displacement the total volumes of the ribs for the 6" unit and the 4" unit, for one side each, were about 2.17 and 0.55 cubic inches respectively and the corresponding volumes of only the totals of initially confined parts were about 3.97 and 1.59 cubic inches respectively. The 6" disk for curve I was softer and had a lower density or higher percent of gas since its two inner rings were of about 75% elastomer and its outer ring was of about 67% elastomer (leaving about 25% and 33% mostly nitrogen gas respectively). The 4" disk for curve II was stiffer and denser having about 87% elastomer (leaving 13% of the total as confined gas). It is noted that these two different area and volume units gives curves approaching nearly the same asymptote A. It is also to be noted that the gas cells or bubbles in this general type of rubber-type formulation tend to merge or interconnect into each other as they get too large or at very high percentages of total gas and this limits the effective upper size limit for the bubbles. The upper size limits given of 0.02 to 0.03" are for generally single or non-interconnected bubbles. Thus some or a few such multiple bubbles may be actually larger without undue detriment in performance. In both tests, the bubble bodies carried over 120,000 pounds pressure without failure and with no material permanent set.

In all forms hereof the shape, height and volume (relative to the confined volume and relation to the remaining volume left for the compressed gas in the bubbles so the projection is compressed into the recess) of the projection will materially affect the shapes of typical curves such as I and II of FIGURE 6. It may also be noted that if the spring members are made of solid rubber or the like, the initial part of a curve such as curve I will be much steeper or stiffer even though the rubber is as soft as can be practically used. The shape of the projection may give a square or even cube type of curve for a relatively limited range of pressures or deflections after which the unconfined portions of such a solid rubber member will fail by bursting out or extruding out. The fatigue life under cyclic use will also be quite low for solid rubber. All of this is in contrast to the advantages and features of this invention and particularly for its fluid or gas-filled bubbles and its absence of any material permanent set or failures for very high deflections and loads. For these and related reasons, solid elastomeric bodies are not used in any of the several forms or applications hereof.

Referring to all of the several illustrated forms of this invention, it is to be noted that the resiliently compressible members need not be bonded or cemented in place but may be mechanically held in position. However, it is usually desirable to have such members cemented or otherwise bonded in place when they have confined portions as disclosed herein. The confining member or structure need only be relatively more rigid and thus may be of plastic or other somewhat yieldable material in all forms hereof. It is also to be noted that the air spring-like characteristics given by gas-filled cells or bubbles under this invention and as illustrated by curves I and II in FIGURE 6, have properties and features which are highly desirable and advantageous over previously used flexible or rubber-like air bags or the like where one or more relatively large volumes of air are confined since these flexible bags fail by bending flexure and require relatively thick and strong walls. Also such bag devices are relatively costly and complex compared to the long lived and simple arrangements possible under this invention. The above described, much higher bursting strengths of the small bubbles of this invention are quite important here and cooperate to give desirable new results, especially for high unit pressures in spring devices and for friction devices.

What I claim is:

1. In combination: a first, relatively rigid part having a recess, a button-like flexibly deformable and resiliently bulk compressible spring body of small closed, discrete gas-filled, bubbles with common walls of flexible material, said recess confining a substantial portion of the initial volume of said body against flow, said spring body having at least one integral projection extending outwardly from said recess, the relative initial volumes of said confining recess, of said total gas volume of said bubbles and of said projection permitting substantially the entire volume of said projection to be compressively deformed and displaced into the initial volume of said confined portion by compression of the gas in said bubbles and said projection having an outer end to be engaged and moved by a second part to bulk compress said projection into said confined portion thereby to resist movement of said second part toward said rigid part.

2. A spring device as defined in claim 1 wherein the gas pressures of the cells or bubbles and their spring rates progressively and rapidly increase with compression and with correspondingly increasing confinement of the spring mass or body as the confinement of the entire volume of the projecting portion or projection is asymptotically approached, and including a second relatively movable part to compressively engage the outer end of the projecting portion or projection and having a normally never bottoming, relatively rigid stop surface not engaging said confining means or recessed rigid part until after substantially complete confinement of the projecting portion or projection at a relatively high pressure.

3. A spring device adapted for resisting movement of opposed members toward one another comprising, a supporting member having a plurality of recesses therein and a surface from which the recesses open, respective bulk compressible spring masses having substantial respective portions thereof mounted in partially confined relation within the respective recesses and having respective portions projecting beyond said surface and generally tapered away from the sides of the recess toward the crowns of the projecting portions, said masses having in at least the confined portions thereof a substantial proportion of small discrete gas-filled bubble-like cells whereby a member opposing said supporting member and engaging the outer ends of the projecting portions of said masses will be resisted in movement with increasing spring rate as the projecting portions of the masses are bulk compressed toward the confined portions of the masses.

4. A spring device as defined in claim 3, wherein said recesses are in the form of concentric grooves and the bulk compressible masses are closed rings, said recesses and the confined portions tapering inwardly from the outer sides of the recesses.

5. A spring device for resisting movement of opposed members toward one another comprising a plate having opposite faces provided with recesses, and bulk compressible elastomeric spring masses seated in partially confined relation within the recesses and having bulk compressible projections extending beyond the faces of the plate and generally tapered away from the sides of the recesses toward the crowns of the projections, said projections being engageable at their crowns with opposing members to resist approach of such members toward the plate by bulk compression of the spring members into the confined portions thereof with increasing spring rate.

6. A spring device as defined in claim 5, in which said recesses on the opposite faces of the plate are relatively staggered, with the recesses on one side of the plate lying along side the recesses on the opposite side of the plate and having common walls therewith.

7. A spring device comprising a plurality of disks, means mounting the disks in concentric stacked relation, and bulk-compressible elastomeric spring masses between said disks, said disks having recesses in which the respective spring masses are seated to a substantial depth with portions of the spring masses projecting from the recesses toward the opposing disks and tapering to a narlower width than the width of the respective recesses and so proportioned in their extent from the recesses with respect to the widths of the recesses as to avoid turning over or bulging onto the sides defining the respective recesses when placed under compression toward said recesses, so as to be compressible into the confined portions of the spring masses upon movement of the disks toward one another without pinching between the recess sides and the compressing disk, confinement of the spring masses in said recesses retaining the masses against flow under the compression and thereby as the projecting portions of the spring masses are compressed toward and into the confined portions of the spring masses resistance to movement of the disks toward one another increases according to an asymptotic curve.

8. A spring device comprising an elongated substantially rigid supporting member providing a channel of substantial depth, an elastomeric bulk compressible spring mass body having a substantial portion thereof mounted in said channel and confined thereby against transverse flow and having a rib-like projection extending substantially beyond the channel and affording a crown against which an opposing member is adapted to be engaged, said projection being contoured relative to said substantial portion so that said projection is compressible toward and into said body, said body having therein a substantial proportion of small closed discrete gas-filled bubble-like cells affording bulk compressibility to the body, and said supporting member having a rigid rib-like projection extending into said substantial portion of the body in substantially symmetrical relation opposite said rib for reducing the volume of the substantial body portion opposite the rib-like projection of the body and especially adapting the device for use as a bumper, machinery mount and the like.

9. A spring device comprising opposed members which move toward one another, each of said members having a surface area opposing the surface area of the other member, said surface areas being movable toward one another when the members move toward one another, at least one of said surface areas having a recess opposing the other of said areas, a bulk compressible resiliently flexible spring mass of a closed cell elastomeric material at least a substantial portion of the volume of which comprises small, generally bubble-like gas cells which are compressible at relatively high spring rates, said spring mass having a substantial portion thereof filling said recess and the mass being thereby confined against flowing under compression to the extent that it fills said recess, another portion of said mass projecting from said substantial portion and out of said recess toward said other surface area and tapering to a narrower width than the width of said recess and so proportioned in its extent from said recessed surface area relative to its width as to avoid turning over toward the sides defining said recess when placed under compression toward said recess, and said projecting portion being bulk compressible toward and into the body of the mass responsive to engagement of the projecting portion by said other surface area on relative movement of the members toward one another and as the compression progresses affording increasing resistance to said movement according to an asymptotic curve due to said confinement of said substantial portion in said recess.

10. A spring device as defined in claim 9, in which said projecting portion has in the uncompressed normal condition thereof a generally flattened crown and arcuate side shape.

11. A spring device as defined in claim 9, in which said projecting portion is in its uncompressed normal condition of an all-over multiple ogee profile.

12. A spring device as defined in claim 9, wherein the surface of the projecting portion is in the normal and uncompressed condition thereof of a smoothly reversely curved profile joining substantially flat areas of said portion in said recess adjacent to the edges of the recess so as to avoid abrupt changes in curvature during deformation of said projecting portion under compression.

13. A spring device as defined in claim 9, including means carried by said member having said one surface area operative on that portion of the mass within the recess to adjust the initial volume of the recess-filling portion of the mass.

14. A spring device comprising in combination: a relatively rigid first part affording a confinement area, a flexibly deformable and resiliently bulk compressible spring member having a substantial part of its volume of filled, small, closed, discrete generally bubble-like cells with common walls of flexible elastomeric material at least part of said bubble-like cells being gas filled, a major part of the volume of said compressible spring member being operatively secured within and confined against flow in said confinement area, said spring member having at least one initially substantially unconfined outwardly projecting portion, and a second and relatively movable part spaced from said first part and having a surface to which said projecting portion is permanently secured and by which said projecting portion is adapted to be resiliently deformed and bulk compressed at least partly into said confined portion by resilient compression of the gas in said gas-filled bubble-like cells in the confined portion for thereby resisting movement of said second part toward said first part with rapidly increasing spring rate.

15. A spring device comprising in combination: a relatively rigid first part affording a confinement area, a flexibly deformable and resiliently bulk compressible spring member having a substantial part of its volume of filled, small, closed, discrete, generally bubble-like cells with common walls of flexible elastomeric material, at least part of said bubble-like cells being gas filled, a substantial portion of the volume of said compressible spring member being within and confined against flow in said confinement area, said spring member having at least one initially substantially unconfined, outwardly projecting portion, adapted to cooperate with a relatively movable part spaced from said first part and having a surface to engage said projecting portion to resiliently deform and bulk compress it at least partly into said confined portion by resilient compression of the gas in said gas-filled bubble-like cells in the confined portion and thereby resist movement of said relatively movable part toward the first part with rapidly increasing spring rate, said spring member including therein closed cells which are filled with a viscous liquid material to provide a high friction upon deformation of the spring member as a result of compression of said projecting portion into said confined portion.

References Cited by the Examiner

UNITED STATES PATENTS

| | | | |
|---|---|---|---|
| 1,470,048 | 10/1923 | Barker | 152—313 |
| 2,685,269 | 8/1954 | Manson | 267—1 |
| 2,686,667 | 8/1954 | Willison et al. | 267—1 |
| 2,716,787 | 9/1955 | Harris | 296—44.11 X |
| 2,744,847 | 5/1956 | Orr. | |
| 2,995,057 | 8/1961 | Nenzell | 277—171 |
| 3,011,218 | 12/1961 | Mitten | 20—69 |
| 3,045,704 | 7/1962 | Williams. | |

FOREIGN PATENTS

| | | |
|---|---|---|
| 907,856 | 3/1954 | Germany. |
| 3,535 | 1883 | Great Britain. |
| 530,630 | 12/1940 | Great Britain. |
| 555,694 | 9/1943 | Great Britain. |

ARTHUR L. LA POINT, *Primary Examiner.*

W. B. WILBER, *Assistant Examiner.*